United States Patent

[11] 3,562,436

[72] Inventor Rudolf O. H. Lutgenau
Coburg, Germany
[21] Appl. No. 675,114
[22] Filed Oct. 13, 1967
[45] Patented Feb. 9, 1971
[73] Assignee Siemins Aktiengesellschaft
Berlin, Germany
[32] Priority Oct. 21, 1966
[33] Germany
[31] S 106627

[54] METHOD FOR SUPERVISION TO DETERMINE THE STATES OF COMMUNICATION LINES
8 Claims, 3 Drawing Figs.

[52] U.S. Cl. .......... 179/18; 179/7.1
[51] Int. Cl. .......... H04m 3/22
[50] Field of Search .......... 179/18.6, 15AEC, 15Sig (Cursory), 18.7YA, 18.9, 7.1

[56] References Cited

UNITED STATES PATENTS 2,924,665 2/1960 Malthaner .......... 179/18(.6)
3,342,939 9/1967 Gattner et al. .......... 179/7.1

*Primary Examiner*—Kathleen H. Claffy
*Assistant Examiner*—Thomas W. Brown
*Attorney*—Birch, Swindler, McKie & Beckett

ABSTRACT: A supervisory control method and circuit therefor wherein supervisory and evaluation circuits are employed to determine the states of a plurality of signal lines. Inquiry elements are operatively associated with the signal lines and are selectively connected in cyclic manner to the supervisory and evaluation circuits to provide a scanning method for successive evaluation of the signal lines. A reset pulse series is employed wherein every second inquiry pulse is preceded by a first reset pulse, and succeeded by a second reset pulse. The supervisory and evaluation apparatus provides for the evaluation of each signal line using inquiry results obtained at four different times over two reset pulse series.

METHOD FOR SUPERVISION TO DETERMINE THE STATES OF COMMUNICATION LINES

BACKGROUND OF THE INVENTION

1. Field of the Invention

The invention relates to the supervisory questioning of signal lines, to determine the existing states thereof. An inquiry element is associated with each signal line, and depending upon its response to the signals in the signal line, supervisory and evaluation apparatus can determine the particular state of the signal line. The invention has particular utility in telephone installations wherein a plurality of signal lines must be constantly supervised to determine the states thereof, and, more specifically, may be employed to count charge pulses.

2. State of the Prior Art

The prior art teaches that a plurality of signal lines associated with a particular system may be scanned periodically to provide inquiry results indicative of the corresponding states of the supervised signal lines. The prior art methods and circuits therefore require that all of the signal lines be scanned at least once during the time duration of the shortest possible signal pulse; otherwise, erroneous indications of the states of the signal lines would be provided.

Further, to preclude multiple counting of an individual signal pulse, the actual registration criteria associated with the scanning of each signal line is ascertained according to the "last-look" method. According to this principle, each inquiry result of a signal line is registered intermediately for the duration of the corresponding inquiry cycle in a register, and is then compared to the successive inquiry result. Since either the transition from the signal-absent state to the signal-present state, or the signal-present state to the signal-absent state, is characteristic for each signal pulse, the registration of a signal pulse should take place only when such a transition is evaluated. Therefore, prior art devices using the described last-look method, require the comparison of the inquiry results of at least two successive scanning cycles. Further, to ensure correct evaluation of the possible states of the signal lines being supervised with certainty, the time interval between successive inquiry pulses associated with each signal line should not be greater than the time duration of the shortest signal pulse to be evaluated, or the time duration of the shortest time interval between successive signal pulses.

Further, the prior art teaches counting and recording individual signal pulses automatically. Alternatively, storage means responsive to the particular states of associated signal lines may be provided, wherein the stored information is indicative of the total number of signal pulses evaluated and is transferred during the corresponding portion of the inquiry cycle associated with its signal line to an intermediate storage device. Then if a signal pulse is evaluated, the information in the intermediate storage device is correspondingly changed before being transferred back to the storage means. The information stored, for example, can be changed by increasing the count thereof by a predetermined number in response to the evaluation of a signal pulse.

Prior art methods also employ bistable memory devices comprising magnetic ring cores, which are particularly advantageous because the magnetic cores can be simultaneously utilized as inquiry gates and storage means thereby decreasing the number of components required. Further, the utilization of a plurality of inquiry pulses to question the signal lines during each inquiry cycle also reduces the number of components utilized, as well as the possibility that signal pulses distorted at the reading and trailing edges thereof as, for example, by overshoot signals or contact actuation, may be erroneously evaluated.

It is further known that the magnetic cores associated with the signal lines may be made responsive only when an inquiry pulse is coincidentally applied thereto with the signal pulse. Then, the magnetic core is reset during the time interval between successive signal pulses by reset pulses that have a repetition rate less than the inquiry pulses. This effectively decouples derivation of the inquiry results from transfer of the stored count from the intermediate storage device to the storage means although the operational speed of the central recording system thereof might be decreased, when the time duration of the signal pulses are less than the time interval between successive signal pulses.

The above-described prior art methods provide a disadvantage because evaluation of the states of the signal lines may also be influenced by distortion pulses occurring between successive signal pulses, and particularly those that simulate a signal pulse, that occur coincidently with an inquiry pulse. Erroneous evaluations of this type could heretofore be practically prevented, if determination of the registration criteria of a signal pulse was dependent upon the simultaneous evaluation of the inquiry results of more than two successive scanning cycles, by increasing the relative time duration of the shortest signal pulse that could thereby be evaluated. This, of course, decreases the number of signal lines that may be supervised by a particular supervisory and evaluation system, and further requires the utilization of intermediate storage elements for the temporary storage of each of the successive inquiry results.

SUMMARY OF THE INVENTION

These and other defects of prior art methods and circuits therefor, for evaluation of receipt of signal pulses applied to a plurality of signal lines in random succession, are solved by this invention. The plurality of signal lines are periodically and cyclically questioned in time succession, and reset signals applied thereto produce inquiry results that are indicative of the states thereof. The time interval between successive questionings of the same signal line is less than the time duration of the shortest distortion-free signal pulse. Individual inquiry elements that may comprise magnetic ring cores having bistable magnetic states are associated with each of the signal lines, which, in response to the reset signal pulses are driven to a corresponding magnetization state. Reset pulses reset the magnetic cores to the original magnetization state, and effect production of corresponding inquiry result control signals that are evaluated and recorded into a central recording device.

The produced inquiry result control signals are indicative of the state of the magnetic core produced in response to signal pulses applied to its associated signal line. Further, means are employed to ensure operation of the evaluation device to correctly evaluate signal pulses. In the event that the evaluation device erroneously evaluates a distortion pulse to be a signal pulse, the evaluation device consequently produces an incorrect evaluation during the next inquiry cycle that nullifies its previous erroneous evaluation. For this purpose, the reset pulses comprise first and second time-spaced pulses of equal polarity. Further, the time period between successive reset pulses is twice the time period between successive inquiry pulses, and the reset and inquiry pulses are synchronized such that every second inquiry pulse is preceded by the first pulse of the reset pulse series, and succeeded by the second pulse of the reset pulse series. The inquiry results derived from the magnetic cores in response to the first and second reset pulses are evaluated simultaneously with the inquiry results obtained from the last occurring reset pulse series to control the the evaluation device according to the last-look principle to ensure correct evaluation of signal pulses. In this regard, the inquiry results obtained in response to a given reset pulse series are temporarily stored for coincident evaluation with the succeeding inquiry results obtained from the succeeding reset pulse series. This provides the advantageous result that distortion pulses simulating signal pulses are not erroneously recorded as signal pulses. Further, distortion signals produced because of the employment of magnetic cores to form a matrix do not produce erroneous evaluations because storage of the applied signal pulses when coincident with inquiry pulses in the magnetic core is decoupled from transfer of the count of the counting device to the central recording device. Therefore, distortion signals caused by coupling between magnetic cores do not produce erroneous evaluations.

Additionally, the utilization of a reset pulse series comprising first and second pulses, and the synchronization thereof with the inquiry pulses as described above, provides the advantage that inquiry results may be derived at two different inquiry pulse times, but can be simultaneously evaluated by the evaluation device, thereby permitting the operational speed of the central recording device to be decreased as compared to the inquiry time associated with signal line supervision, which is not possible when known methods employing the last-look principle over several inquiry cycles are employed.

The invention also contemplates in a method employing the last-look principle over a reset pulse series cycles, the time period between successive inquiry pulses should be $$\leq \frac{1}{2(n-1)} t_j$$

wherein $t_j$ represents the time duration of the shortest undistorted signal pulse. Then, if the $2(n-1)$ inquiry results obtained through the $(n-1)$ reset pulse series are temporarily stored for use in conjunction with the last-look principle, the reliability against distortion pulses is substantially increased.

A practical embodiment of the invention takes into account the fact that generally an acceptable reliability against incorrect evaluation of distortion pulses can be obtained when the last-look principle is employed and is limited to $n=2$ reset pulse series cycles. In this case, two additional storage devices per signal line being supervised must be employed to temporarily store the inquiry results of the preceding reset pulse series cycle. The percentage reliability then obtained is the same as that obtained in prior art methods employing the last-look principle over three inquiry cycles, which also must employ two additional storage devices per signal line being supervised, as well as an additional AND gate in the evaluation apparatus. However, the method according to the invention provides the advantageous result that the operational speed associated with the central recording system may be decreased to one-half while the reliability against erroneous evaluation of storage pulses remains the same, or alternatively, the number of signal lines being supervised in association with the central recording system may be doubled.

DETAILED DESCRIPTION OF THE INVENTION

Figure 1:
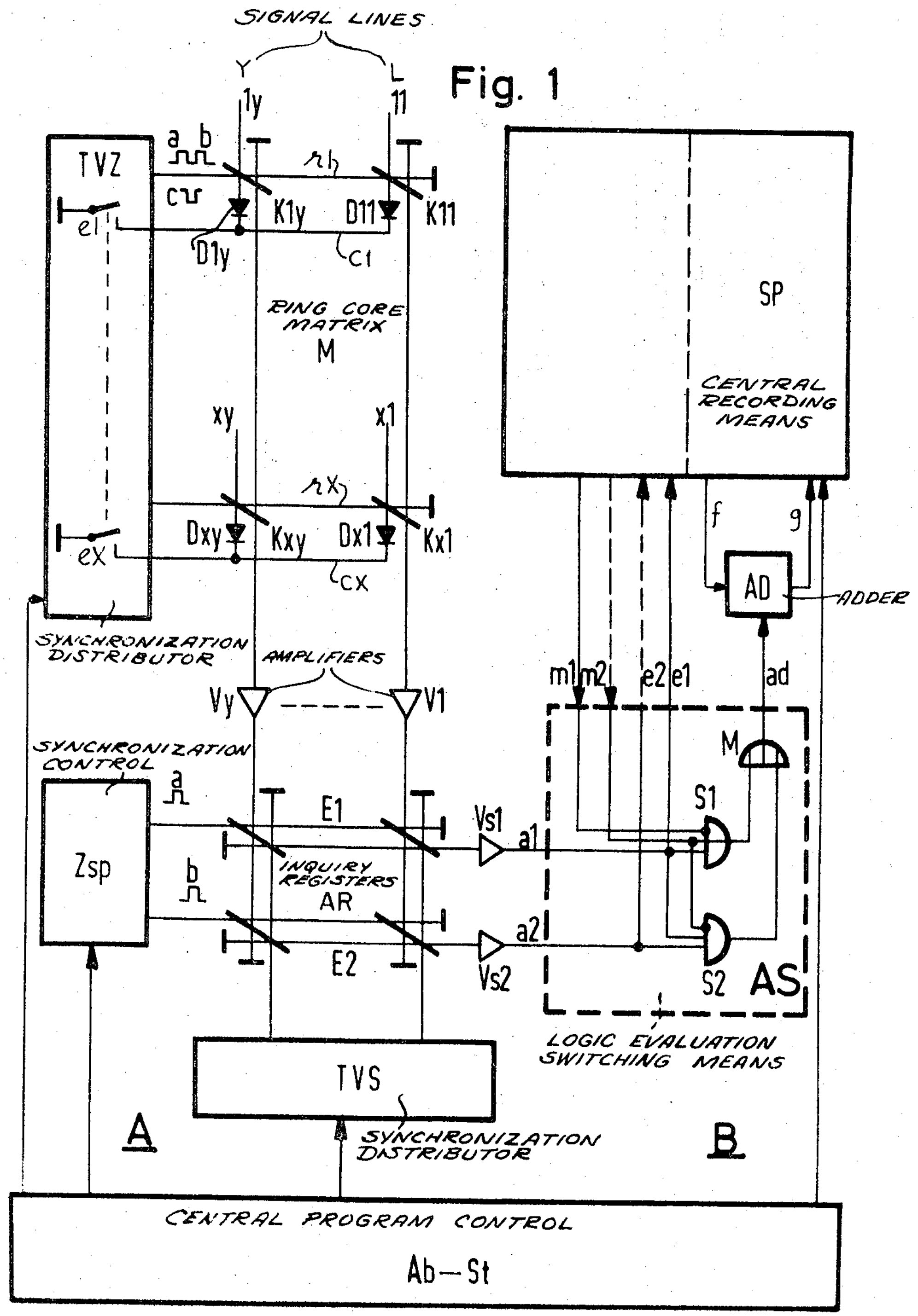
Fig. 1 is an electrical schematic diagram of the circuit that may be employed to practice the method according to the invention.

The system shown in FIG. 1 may be broadly divided into sections A and B, connected by logic evaluation switching device AS and central program control device A*b*–S*t*.

Section A functions to classify the signal pulses randomly fed to signal lines 11 through *xy*, each of which may be associated with a local multiplex system, for evaluation by time multiplex means. For this purpose, an inquiry element is assigned to each signal line, and may comprise a magnetic ring core memory device that has bistable magnetization states (hereinafter referred to as magnetic core). Thus, magnetic cores K11 through K*xy* are assigned to signal lines 11 through *xy*, respectively, and are arranged to form matrix M. The signal lines are threaded through their assigned magnetic cores, such that the currents present in each signal line effect corresponding magnetization of the assigned magnetic core. A plurality of associated signal lines are successively connected by a common connection line C*l*...C*x* to synchronization distributor TVZ. For example, signal lines 11 through *ly* are connected to common connection line C1, and signal lines x1 through *xy* are connected to common connection line C*x*. A plurality of additional common connection lines may be employed as desired, depending upon the umber of signal lines to be supervised.

Synchronization distributor TVZ comprises plurality of successively actuated switches, *el* through *ex*, that are cyclically actuated to the closed position to complete the electrical connections for the associated signal lines. Thus, when switch *e*1 is closed, the electrical connection for signal lines 11 through *ly* is completed through closed switch *el*. Similarly, at a predetermined time associated with the cyclical successive actuation of switches *el* through *ex*. switch *ex* is actuated to the closed position to complete the electrical connection for signal lines *x*1 through *xy*. Additionally, diodes D11 through D*xy* are interposed between the individual signal lines and the corresponding common, connection lines polarized to apply only positive signals thereto. Therefore, it is seen that the signals present in the signal lines are cyclically sampled and stored in their assigned magnetic cores when the corresponding switch associated with synchronization distributor TVZ is actuated to the closed position.

The plurality of magnetic cores assigned to associated signal lines are arranged in column connection lines L and Y and row connection lines *rl*...*rl*, which are threaded through their associated, magnetic cores to form matrix M. Further, the magnetic state of each of the magnetic cores is responsive to the signals present in its associated signal line. The magnetic cores associated with a particular row connection line (for example, *r*1 or *rx* are simultaneously questioned, and successive rows are cyclically questioned to provide substantially continuous supervision of the signal lines.

Synchronization distributor TVZ successively applies time-spaced first and second reset pulses *a* and *b* which comprise each reset pulse series to the row connection lines. Depending upon the magnetization states of the magnetic cores associated with the row being questioned resulting from signals present in the signal lines to which they are assigned, the reset pulses produce corresponding inquiry result control signals that are applied to column lines L and Y. The inquiry result control signals of the magnetic cores associated with the L column connection line are amplified by amplifier V1, and the output signals of the magnetic cores associated with the Y column connection line are amplified by amplifier V*y*.

Inquiry register AR comprises first and second inquiry register elements, E1 and E2, which are successively activated by synchronization control device Z*sp*, which may comprise a commutator, for example, to register the response of the magnetic cores being questioned to reset pulses *a* and *b*, respectively. Thus, the states of the individual magnetic cores associated with the row connection lines are successively registered in inquiry register AR. Synchronization distributor TVS successively distributes the registered output signals of the individual magnetic cores comprising each row connection line, to logic evaluation switching device AS. Inquiry result control signals produced as a result of reset pulse *a* are transmitted over output line al, of inquiry register element E1 to logic evaluation switching device AS. Further, inquiry result control signals produced as a result of pulse b are transmitted from inquiry register element E2 to logic evaluation switching device AS over output line a2. The evaluation switching device AS evaluates the states of the signal lines questioned by evaluating the inquiry result control signals a1 and a2 of inquiry register AR, and produces corresponding evaluation signals z1 and z2, indicative of the states of the signal lines, and more particularly, whether signal pulses are present therein.

Central control device A*b*–S*t* synchronously controls synchronization distributors TVZ and TVS to successively apply first and second reset pulses a and b in sequential manner to the row connection lines, and successively apply the inquiry result control signals a1 and a2 registered in inquiry register elements E1 and E2, respectively, to logic evaluation switching device AS, to thereby develop an information signal series indicative of the states of the signal lines associated with each row connection line.

Section B comprises the central recording device S*p*, that comprises a plurality of individual storage sections corresponding to the number of signal lines being supervised. For example, it may comprise a magnetic cylinder having sections reserved for each signal line or a row of magnetic ring cores individually assigned to specific signal lines, or equivalent means, to store the inquiry result control signals corresponding to the signals present in the signal lines. The storage may be in binary code, for example in the form of a tetrad key. Of course, the storage capacity depends upon the maximum number of signal pulses to be stored.

Central adding device AD adds the number of signal pulses that may be randomly applied to each signal line. Thus, central program control system A*b*–S*t* transfers the count corresponding to the total number of signal pulses previously received by each signal line to central adding device AD over line *f*, during the questioning or inquiry period associated with each signal line as determined by the information series produced by synchronization distributor TVS at the output of inquiry register AR. If during said questioning or inquiry period a signal pulse is applied to the signal line being questioned, the central adding device AD will add that to the existing count stored in central recording device SP, and transfer the new count to the central recording device SP for storage therein over line *g*. The cycle is continuously repeated during supervision of the signal lines, and central program control device or system A*b*–S*t* synchronizes the operation of central adding device AD and central recording device SP with the operation of the synchronization distributor TVZ. In this manner, transfer of the existing count of successively questioned signal lines to central counting device AD is coincident with production of the inquiry result control signals by the assigned magnetic core in response to the reset pulse series which produce a corresponding count control signal that is applied to central adding device AD by line ad. Thus, when a signal pulse is evaluated, logic evaluation switching device AS controls central counting device AD to increase the existing count and to transfer the new count to central recording device SP for storage to thereby provide an indication of the latest total signal pulse count of each signal line. This is then transferred to the central counting device AD during the succeeding questioning or inquiry period assigned to each signal line, and the sequence described is thereby repeated, during succeeding inquiry cycles.

The logic evaluation switching device AS determines when the system's response to the signal present on the signal line being supervised at a particular time, is to be added to the previous count stored in central recording device SP. Thus, logic evaluation switching device AS comprises logic gates S1, S2, and M. It is seen that inquiry register element E1 is connected to the inputs of logic gates S1 and S2 by line al, and that inquiry register element E2 is connected to the input of logic gate S2 by line a2. Further, lines a1 and a2 are connected to central recording device SP by lines *e*1 and *e*2, respectively, to temporarily store the inquiry result control signals for use during the succeeding inquiry cycle. Then, during the succeeding inquiry cycle, the inquiry result control signals produced during the previous inquiry cycle and temporarily stored in central recording device SP are applied to logic gates S1 and S2 by lines m1 and m2. In this regard, the inquiry result control signals present on line a1 are applied to the central recording device SP by line e1 for temporary storage during a particular cycle, and is then applied to logic gate S1 during the succeeding cycle by line m1. Similarly, the inquiry result control signals present on line a2 are applied to central recording device SP by line e2 for temporary storage therein during an inquiry cycle, and is then applied to the inputs of logic gates S1 and S2 by line m2 during the succeeding inquiry cycle. Instead of the described temporary storage in central recording device SP, the inquiry result control signals could also be temporarily stored in individual synchronously controlled shift registers.

Figure 2:
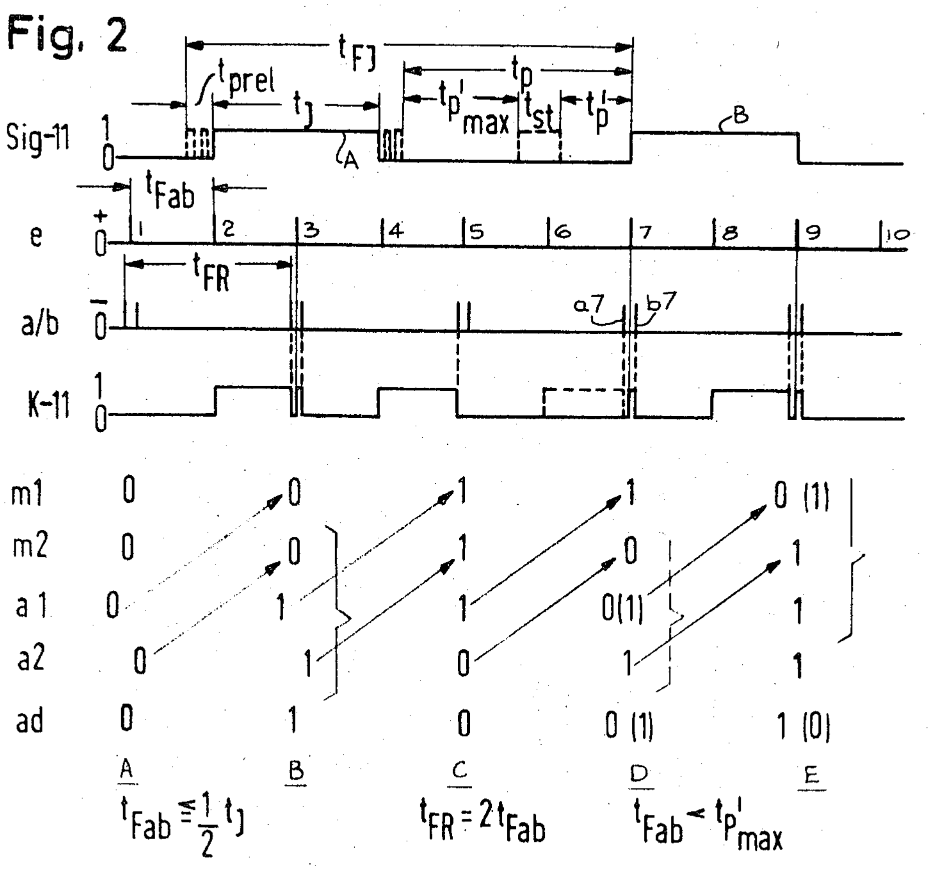
FIG. 2 is a series of graphs and tables illustrating the operation of the circuit shown in FIG. 1.

Therefore, it is seen that the inputs to logic gate S1 are the signals present in lines m1, m2, and a1. Further, the inputs to logic gate S2 are the signals present line m2, a1, and a2. Further, as shown in the tables of FIG. 2, during the questioning of a particular signal line in a given inquiry cycle, the signals present in lines m1 and m2 are the same as the signals present in lines a1 and a2, respectively, during questioning of said signal line during the previous inquiry cycle. Therefore, the inputs to logic gates S1 and S2 represent different series of three inquiry result control signals associated with a particular signal line which are derived at four different times. For example, the inputs to logic gate S1 are the signals present on control lines m1, m2, and line a1, with the signal present on line m1 being the inquiry result control signal a1 produced in response to reset pulse *a* of the last inquiry cycle, the signal present on line m2 being the inquiry result control signal produced in response to reset pulse *b* of the last cycle, and the signal present on line a1 being in the inquiry result control signal produced in response to inquiry signal *a* of the current inquiry cycle. Similarly, the inputs to logic gate S2 (m2, a1, a2) represent a series of inquiry results obtained at different relative times.

The operation of the logic evaluation switching device AS may be best explained with reference to FIG. 2. There, the first graph Sig-11 shows the signals with respect to time present on signal line 11. Of course, it is to be understood that this is only an illustrative example given to explain the invention, and that the invention is not limited thereto. The next graph, *e*, illustrates the cyclic operation of synchronization distributor TVZ which successively actuates switch e1 to the closed position in response to inquiry signals at a predetermined time at least once during each inquiry cycle, so that inquiry results may be obtained. The next graph, *a*/*b*, illustrates the successive application of reset pulses *a* and *b* to the magnetic cores associated with a given row connection line, in this case row connection line r1, having associated magnetic cores K1y and K11. It is seen with reference to graph e1 and graph *a*/*b* that the actuation of switch e1 to complete the electrical connection for the associated signal lines in response to the inquiry pulses produced by synchronization distributor TVZ (in the given example, signal lines 1*y* and 11) occurs during the tine interval between the application of reset pulses *a* and *b* to the assigned magnetic cores (in the example, magnetic cores K1*y* and K11) and functions to store signal pulses, if any, in the corresponding magnetic cores.

The next graph K-11 shows the state of magnetic core K11 associated with signal line 11. Also, a table is shown illustrating the signals (in binary form) present in various parts of the circuit, and more particularly, on lines m1, m2, a1, and a2, and ad, at various times, to explain how a count control signal is fed to central counting device AD by logic evaluation switching device AS through line ad to effect an increase in the signal pulse count associated with a given signal line.

It can be seen with reference to FIG. 2 that an inquiry signal must be coincident with the binary 1 signal condition of signal line 11 in order to change the magnetic state of assigned magnetic core K11 to the binary 1 condition to effectively store the corresponding signal pulse therein. In this regard, the binary O signal condition of the signal line may be assumed to be indicative of the absence of a signal pulse. Further, reset pulses *a* and *b* are synchronized with the cyclic actuation of switch e1 in such a way that every second inquiry signal is preceded by reset pulse *a* and followed by reset pulse *b*, of the corresponding reset pulse series. The time interval between reset pulses *a* and *b* is selected such that the magnetic cores have sufficient time to correctly respond to the signals present in their associated signal lines, when an inquiry signal is coincident therewith.

If a magnetic core is effectively empty (corresponding to the binary O state and the absence of a signal pulse in its associated signal line), reset pulses *a* and *b* would cause inquiry result control signals equal to binary O that are applied to the inquiry register AR to be produced. However, if a magnetic core is filled (corresponding to the binary 1 condition and the presence of a signal pulse), reset pulses *a* and *b* would cause binary 1 inquiry result control signals that are applied to inquiry register AR to be produced. As explained above, each inquiry result control signal a1 obtained in response to inquiry pulse *a* is identified as inquiry result control signal m1 during the succeeding inquiry cycle, and each inquiry result control signal a2 obtained in response to reset pulse *b* is identified as inquiry result control signal m2 during the succeeding inquiry cycle. This is shown by the table in FIG. 2 by the arrows between the indicated states of lines a1 and a2, and lines m1 and m2, respectively, during succeeding evaluation times.

Therefore determination of whether a charge pulse (corresponding to a signal pulse) is present in signal line S1l, in which event a count command represented by a binary 1 count control signal applied to central counting device AD to advance the count thereof, is made by comparing the inquiry results of two successive inquiry cycles, and that, therefore, inquiry results occurring at four successive times (m1, m2, a1, a2) are employed to make the determination.

The logic evaluation switching device AS is responsive to produce a count command control signal that is applied to central counting device AD, only when the inputs to either of logic gates S1 or S2 comprise inquiry result control signals representative of successive inquiry results having the series binary 0-1-1 That is, when the inputs to logic gate S1 (m1, m2, a1) or logic gate S2 (m2, a1, a2) are equal to binary O-1-1, respectively, they produce corresponding output signals that control logic gate M through to produce a binary 1 count control signal that is applied to central counting device AD and is representative of a count command control signal which advances the count associated with the signal line, and then effects transfer of the count for storage in central recording device SP.

Several criteria are employed in order that the logic evaluation switching device AS correctly evaluates the signals applied to the signal lines being supervised. Thus, it is necessary that at least two cyclic actuations of switch e1 to the closed position in response to two inquiry signals or pulses to produce inquiry results indicative of the state of its associated signal line 1l be coincident with an undistorted signal pulse of time duration equal to at least time $t_j$. If this criterion is not met, the production of the inquiry result time succession, binary 1-1, in response to the reset pulses *a* and *b* of a given reset pulse series is not guaranteed.

Successive inquiry signals associated with each common connection line and the associated signal lines, occur at a scanning frequency wherein the time period between successive inquiry signals, $t_{Fab}$ (Fig. 2, graph *e*), corresponds to the time period between inquiry signals in a prior art method that employs the last-look principle and an evaluation system associated therewith extending over three inquiry cycles. However, the operational speed of the recording system according to the invention is not determined by the scanning frequency (of successive inquiry signals applied to each common connection line) of the inquiry cycle. Rather, the time period between successive series of reset pulses *a* and *b* ($t_{FR}$) controls the operational speed of the recording system, and as explained above, this is twice as long as time period $t_{Fab}$ of the signal line scanning frequency. Under these conditions, if time period $t_{FR}$ is twice time period $t_{Fab}$, and assuming an equal number of signal lines are to be supervised under the invention compared to a method employing the last-look principle and an evaluation system extending over three successive inquiry signals, the operational speed of the recording system under the invention can be decreased to one-half, or alternatively, the number of signal lines that may be supervised can be doubled. This advantageous result is produced because each reset pulse series provides an indication of the existing signal line condition while the signal line condition existing during the immediately preceding reset pulse series is also made available for use by the logic evaluation switching device AS.

An additional criterion to guarantee proper evaluation of successive signal pulses requires that at least one inquiry signal *e* occur during the time interval between two successive signal pulses. Then, if a distortion pulse simulating a signal pulse is applied to the signal line during the time interval between two successive signal pulses, at least one distortion-free time interval $t_p'_{max}$ is available during the time interval between two successive signal pulses which is greater than the time period $t_{Fab}$ of the scanning frequency. In this manner, distortion pulses occurring in the time interval between successive signal pulses will not be erroneously evaluated to be signal pulses, if their time duration $t_{st}$ is less than the time period $t_{Fab}$ between successive inquiry signals. In other words, the invention provides under this criterion, that the incorrect evaluation of all distortion pulses can be eliminated, if said distortion pulses are of time duration less than one-half of the time duration of an undistorted signal pulse. Further, if this criterion is met, it does not make any difference whether the time interval between two successive distortion pulses, or time interval $t_p'$ between a distortion pulse $t_{st}$ and the preceding or succeeding signal pulse is less than the minimum distortion-free time interval $t_p'_{max}$.

For example, in the most unfavorable instance, with reference to FIG. 2, distortion pulse $t_{st}$ has driven magnetic core K1l to binary condition 1. That is, since distortion pulse $t_{st}$ was applied to signal line 1l coincidently with inquiry signal or pulse 6, the electrical connection for signal line 1l was completed because switch e1 was actuated to the closed position, and therefore distortion pulse $t_{st}$ was stored in magnetic core K1l and drove it to the magnetic condition represented by binary 1. (In this regard, as explained above, the magnetic cores comprise magnetically bistable memory devices and may be assumed to have first and second magnetically stable states or conditions.) Then, at the succeeding evaluation time, pulse a7 of the reset pulse series, *a*/*b*, when applied to row connection line r1, causes an inquiry result control signal equal to binary 1 instead of binary O to be produced by column connection line L through inquiry register AR to line a1. Further, since inquiry pulse 7 coincides with the succeeding signal pulse B, reset pulse b7 causes an inquiry result control signal a2 equal to binary 1 to be produced, so that the series comprising m2, a1, a2 equal to binary O-1-1, respectively, is produced at time D, and therefore causes logic gate S2 to control logic gate M to erroneously apply a count command control signal (count control signal ad equal to binary 1) to central counting device AD. Thus, distortion pulse $t_{st}$ causes a count command control signal to be produced too soon (it should have been produced under distortion-free conditions at times E). However, the net effect of this erroneous evaluation of distortion pulse $t_{st}$ is nullified because at the succeeding evaluation time, E, the erroneous production of a registration command control signal during time D causes a corresponding erroneous evaluation at time E. This is illustrated in FIG. 2, wherein the table shows that at evaluation time E, lines m1, m2, a1, and a2 have signals present therein corresponding to binary 0-1-1-1, respectively, and the logic evaluation switching device AS therefore does not produce a count command control signal.

Under distortion-free conditions, where distortion signal $t_{st}$ would not be present on the signal line, lines m1, m2, a1, and a2 would have signals present therein corresponding to binary 1, 0, 0, 1 and binary 0, 1, 1, 1 during evaluation times D and E, respectively, and as shown in FIG. 2, the logic evaluation switching device AS would produce a count command control signal during evaluation time E, but not during evaluation time D. Therefore, it is seen that the invention as disclosed herein employs the last-look principle over only two successive reset cycles and produces a degree of reliability against erroneous response of the logic evaluation apparatus comparable to a prior art method employing the last-look principle over three successive inquiry cycles, even in view of the fact that it simultaneously evaluates signal line conditions at four successive times at each evaluation time. This is due to the fact that it cannot be guaranteed that the first inquiry pulse *e* coinciding with a signal pulse is preceded by reset pulse *a* and succeeded by reset pulse *b* of the reset pulse series *a/b*. Only if this criterion is met would the reset pulse series produce the inquiry result control signal series wherein a1 and a2 are equal to binary O and 1 in response to reset pulses *a* and *b*, respectively. (See evaluation time D under distortion-free conditions.)

However, this is not entirely disadvantageous because the inquiry result control signals produced in response to reset pulses *a* and *b* of the reset pulse series *a*/b may be combined to form a single inquiry result control signal and may be temporarily or intermediately stored to simplify the logic evaluation switching device. That is, since only 50 percent of the total reset pulse series *a/b* produce an inquiry result control signal wherein a1 a2 are Fabto binary O and 1, respectively, this inquiry result series can be completely disregarded. However, if this is done, the method and system therefor must guarantee that the succeeding reset pulse series *a/b* produces an inquiry result control series wherein a1 and a2 are both equal to binary 1 in order to obtain the inquiry result series succession binary 0-1-1 that is indicative of a signal pulse. Since this series can only be produced if the preceding inquiry pulse coincides with the signal pulse, the time interval between successive inquiry pulses associated with a particular signal line, $t_{Fab}$, must be corresponding decreased compared to the method explained heretofore according to the invention, to a value that is $$-\frac{1}{n+1}t_i$$

wherein *n* designates the number of reset pulse series cycles over which the last-look extends.

For example, assuming that the last-look extends over two reset pulse series cycles *a/b*, the time interval $t_{Fab}$ between successive inquiry pulses *e*, would decrease to one-third of time duration $t_i$ of the shortest undistorted signal pulse. However, an increase in the operational speed of the recording system as compared to the prior art method employing the last-look principle extending over three inquiry cycles would result, while the relative reliability of the two methods would be the same.

Figure 3:
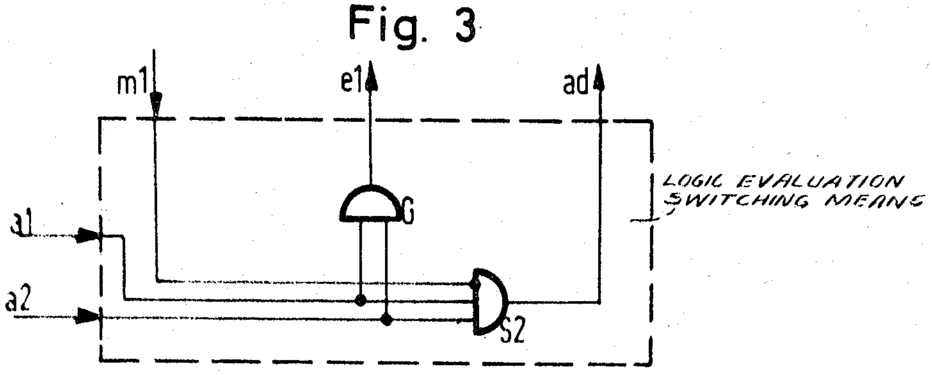
FIG. 3 is a block diagram of a logic evaluation device that may be used alternatively to that shown in FIG. 1 according to the invention.

FIG. 3 shows a logic evaluation switching device for use with the above-described alternative method. Thus, AND gate G is connected to lines a1 and a2, and produces a binary 1 output only when lines a1 and a2 both apply binary 1 input signals thereto. The output produced by AND gate G is applied by line *e* to recording device SP for temporary storage and is applied to the input of logic gate S2 by line m1 during the next evaluation time. Therefore, only the inquiry result series binary 1-1 produced in response to reset pulses *a* and *b* of a given reset pulse *a/b* series produces a binary 1 output from gate G, to maintain logic gate S2 in blocked condition. All other possible inquiry result series, that is, binary O-O, binary O-1, and binary 1-0, cause a binary O output to be produced by AND gate G and to be applied to the input of gate S2 during the next evaluation time, to cause a binary 1 output to be produced at its output, when binary 1 signals are applied thereto by lines a1 and a2. Then, logic gate S2 may be directly connected by line ad to the central counting device AD which operates as heretofore explained. The arrangement shown in FIG. 3 requires only one temporary storage means per signal line compared to two in the arrangement show in FIG. 1, while having the same reliability percentage. This is particularly advantageous where the last-look extends over an extended number of inquiry cycles because of the characteristics of the distortion pulses.

If negative distortion pulses may also be applied to the signal lines in addition to the positive distortion pulses shown in FIG. 2, which would in effect divide signal pulses into partial signal pulses, a diode may be connected in series with the signal lines as shown in FIG. 1. Thus, blocking diodes D11 through D*xy* are shown connected in series with the signal lines 11 through *xy*, respectively, to block negative pulses.

An alternative method of controlling the magnetic cores, compared to the switching method employed by synchronization distributor TVZ, provides for premagnetization of the magnetic cores associated with each row in cyclical manner by premagnetization means. The premagnetization means would prevent in its hold state storage of the signal pulses in the magnetic cores, but could cyclically disconnected from the magnetic cores to provide for storage of the signal pulses therein. Then, the premagnetization device would not be operative to be able to switch the filled magnetic cores back to the original magnetization condition. However, this type of alternative arrangement would be more expensive than that described with relation to FIG. 1.

Another alternative possibility would be to provide for storage of the signal pulses in the assigned magnetic cores only when the signal pulses and an enabling signal applied to the row connection lines are coincidently applied to the supervisory system. However, this would be relatively more expensive than the system disclosed in FIG. 2.

The described operation of the method and circuit according to the invention did not take into account the response times associated with the magnetic cores and other elements such as contacts associated with the described circuit. Generally these are fast acting elements and, therefore, their response times are not critical. However, it is understood that where the response times are critical, they would correspondingly be taken into account in determining the time criteria discussed with relation to FIG. 2.

Numerous modifications and adaptations of the system of the invention will be apparent to those skilled in the art, and thus it is intended by the appended claims to cover all such modifications and adaptations as fall within the true spirit and scope of the invention.

I claim:

1. A method of supervising a plurality of signal lines having assigned bistable magnetic cores to evaluate time spaced signal pulses applied thereto comprising:
   - sampling the plurality of signal lines periodically in time multiplex manner at a predetermined sampling frequency having a corresponding time period between successive samplings equal to $t_{Fab}$;
   - storing sampled signal pulses by driving the assigned magnetic cores to a magnetically stable condition in response thereto;
   - resetting the assigned magnetic cores to their original magnetic condition by applying a reset pulse series thereto having first and second reset pulses of the same polarity at a predetermined frequency having a corresponding time period between successive reset pulse series equal to $t_{FR}$;
   - deriving inquiry result control signals in response to resetting of the assigned magnetic cores to their original magnetic conditions;
   - synchronizing sampling of the signal lines and applying reset pulse series to the magnetic cores so that every second sampling is preceded by the first reset pulse and succeeded by the second reset pulse of a reset pulse series;
   - evaluating simultaneously the inquiry result control signals derived in response to the first and second reset pulses of *n* reset pulse series to determine when signal pulses are applied to the signal lines: and
   - causing registration of evaluated signal pulses to provide an indication of the number of signal pulses applied to each signal line.

2. The method as recited in claim 1 further comprising:
   - storing intermediately the inquiry result control signals successively derived during the $(n-1)$ reset pulse series immediately preceeding the $n^{th}$ reset pulse series; and
   - evaluating simultaneously the inquiry result control signals derived over *n* successive reset pulse series.

3. The method as recited in claim 2 further comprising: maintaining the sampling frequency time period $$t_{Fab} \leq \frac{1}{2} \frac{t_j}{(n-1)}$$

where $t_j$ represents the time duration of the shortest undistorted signal pulse.

4. The method as recited i claim 1 further comprising: maintaining the sampling frequency time period $$t_{Fab} \leq \frac{1}{2} \frac{t_j}{(n+1)}$$

where $t_j$ represents the time duration of the shortest undistorted signal pulse;

producing a single intermediate signal from the inquiry result control signals derived during each of the $(n-1)$ reset pulse series immediately preceding the $n^{th}$ reset pulse series when production of said signal is indicative of the continued application of a signal pulse;

storing intermediately single intermediate signals: and evaluating simultaneously the inquiry result control signals derived in response to the first and second reset pulses of the $n^{th}$ reset pulse series and the stored single intermediate signals to determine when signal pulses are applied to the signal lines.

5. The method recited in claim 1 further comprising: evaluating simultaneously inquiry result control signals over $n=2$ reset pulse series.

6. The method recited in claim 1 further comprising blocking signals of a predetermined polarity from being evaluated.

7. The method recited in claim 1 wherein $t_{FR}=2(t_{Fab})$.

8. The method as recited in claim 4 wherein only a succession of binary one inquiry result signals will permit a binary one to be intermediately stored.